Nov. 25, 1930.                K. K. NIELSEN                1,782,791
ADJUSTABLE FIXTURE STRAP
Filed Aug. 12, 1929
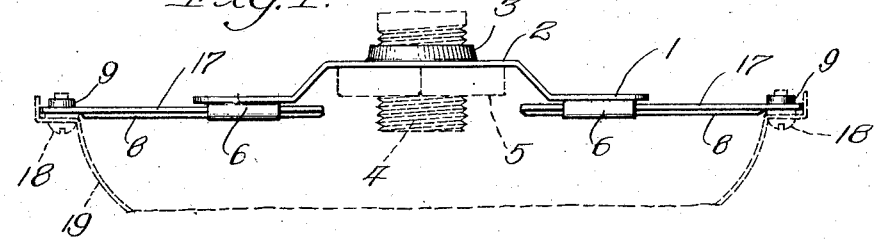
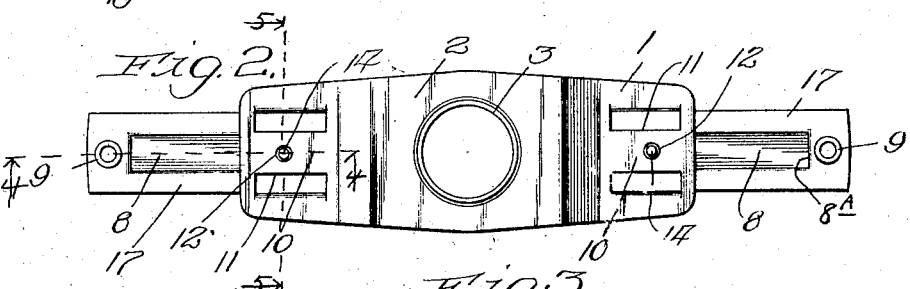
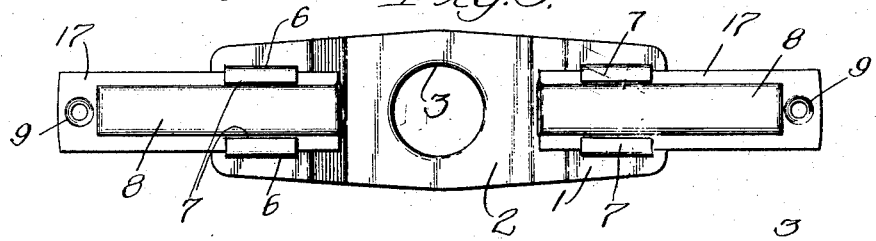
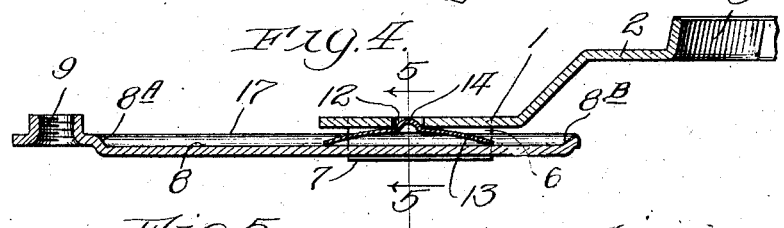
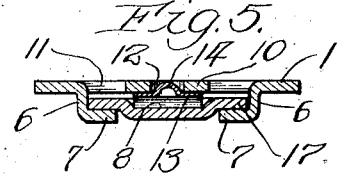
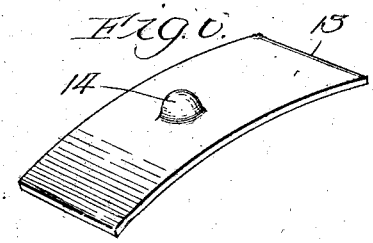
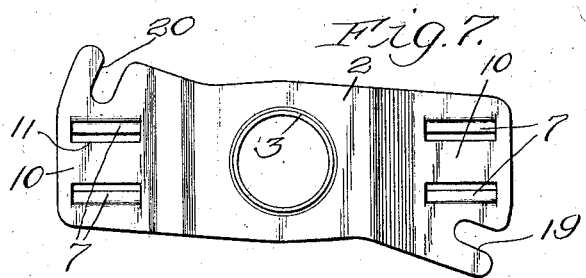
Inventor:
Karl K. Nielsen
by Albert Scheib
Attorney Patented Nov. 25, 1930

1,782,791

UNITED STATES PATENT OFFICE

KARL K. NIELSEN, OF CHICAGO, ILLINOIS, ASSIGNOR TO ALCOR MANUFACTURING COMPANY, OF CHICAGO, ILLINOIS, A CORPORATION OF ILLINOIS

ADJUSTABLE FIXTURE STRAP

Application filed August 12, 1929. Serial No. 385,232.

My invention relates to fixture-attaching straps suitable for supporting canopies, brackets or the like from outlet boxes or conduits, and particularly to the class of such fixture straps which are adjustable in their effective length so as to be adapted for use with canopies and the like of varying diameters.

Such adjustable fixture straps have long been used in a three-piece construction comprising a central body and two extension arms, these arms being slidably mounted on the central body so that the total length of the strap can be varied by sliding the arms either toward or away from each other.

In some of the types heretofore employed, the extension arms partly overlap, it being assumed that the friction of these arms upon each other and on the central body member would prevent a relative sliding of these parts. In practice, the friction has not proven sufficient for this purpose, so that one or both of the extension arms are apt to slide out of their adjusted position unless locked by some positive means such as screws. However, the use of screws for latching the arms in their adjusted positions has also proven objectionable, both because of the added time required for the initial loosening and subsequent tightening of each screw during the installation of the fixture strap, and also because the screws are apt to jar loose.

Furthermore, some of the types of adjustable fixture straps heretofore employed depend on screws for limiting the outward sliding of the extension arms, thus introducing the risk of accidents in case one of the stop screws falls out and permits the corresponding arm to be slid too far.

My present invention aims to overcome all of these objections by providing an adjustable fixture strap in which simple springs greatly increase the friction between each extension arm and the central body part so as to deter a relative sliding of these parts, and in which each spring also serves as a stop for limiting the sliding of the arm with which it is associated, thereby eliminating the need of screws either for latching the arms in their adjusted positions or for guarding against an excessive sliding of the arms in either direction.

Furthermore, my invention provides a simple, light and easily manufactured construction for this purpose and one in which each spring is interlocked with the central body part without requiring a screw or other auxiliary fastening member for that purpose.

Still further and also more detailed objects will appear from the following specification and from the accompanying drawings, in which Fig. 1 is a side elevation of a fixture strap embodying my invention, showing the same partly extended, and with dotted lines indicating portions of the fixture stud which supports the strap and of a canopy supported by the strap.

Fig. 2 is a plan view of the same fixture strap with its arms slid out to elongate the device, and Fig. 3 is a bottom view of the same.

Fig. 4 is an enlarged and fragmentary section taken longitudinal of the same fixture strap along the line 4—4 of Fig. 2.

Fig. 5 is a similarly enlarged transverse section taken along the line 5—5 of Fig. 2.

Fig. 6 is an enlarged perspective view of one of the springs.

Fig. 7 is a plan view of a modified form of the central member of my fixture strap.

In the embodiment of Figs. 1 to 6, the central or main body portion of my fixture strap is punched from flat sheet metal and has its two horizontal end portions 1 offset downwardly from the horizontal medial portion 2. This medial portion 2 is provided at its middle with an upright tubular formation 3 of such size that the usual fixture stud 4 can slip downwardly through it, thereby permitting this central strap part to be supported by a nut 5 threaded on the fixture stud.

Each end portion 1 has two angle-sectioned guides formed on it to present vertical guide webs 6 supporting horizontal webs 7 which extend toward each other from the vertical webs 6 at some distance below the plane of the bottom of the main part of the end portion 1. These horizontal webs 7 on each end portion of the main part of my fixture strap jointly support one of the extension members 17 of the strap. Each of these extension members is downwardly embossed to afford a trough-like recess 8, and has a threaded vertical bore 9 near its outer end beyond the outer end 8A of the trough. The two angle-sectioned guides on each end portion of the central strap part are sufficiently spaced from each other transversely of that part to leave a metal strip 10 between the slots 11 which are formed by the punching of the guides, and this strip 10 is provided with a perforation 12, as shown in Figs. 2 and 5.

Interposed between each of these strips 10 and the bottom of the trough-like recess underhanging it is an upwardly bowed spring 13 formed from flat sheet metal and having an upwardly extending central nub 14, which nub is socketed in the strip perforation 12. This spring 13 is formed so that it normally would bow to a greater height than the vertical distance between the bottom of the adjacent trough 8 and the lower face of the strip 10, so that each spring in the assembled strap (as in Fig. 4) is somewhat compressed in height. Moreover, each spring 13 is considerably shorter than the length of the adjacent trough, and is slightly narrower than the width of the trough so that the side walls of the trough slidably guide the longitudinal edges of the tip portions of the spring.

Owing to this difference in length between each spring and the adjacent trough, each end part 7 of my fixture strap can be slid from its position in Fig. 4 toward the vertical central axis 15 of the strap until the outer end of the spring engages the outer end wall 8A of the trough which underhangs the spring, and also slid away from the said axis 15 until the inner end of the spring engages the inner end wall 8B of the same trough. In other words, each spring (which is prevented from sliding with respect to the main strap part by the socketing of its nub 14 in one of the perforations 12) serves both for frictionally resisting a sliding of the extension strap member associated with it, and for limiting such sliding. Consequently, the effective length of my fixture strap can instantly be adjusted manually, and the spring pressures increase the friction of the extension members on the guides so that these extension members will not move accidentally out of their adjusted positions.

Moreover, each spring positively limits the sliding of one of the extension members on the central main member, so that these extension members cannot be slid too far, (or to an insecure position), as has been possible with some heretofore devised adjustable fixture straps.

In assembling my fixture strap, each completely formed extension member is slid into a position between one pair of guides, such as the position shown in Fig. 4, after which one of the springs is slid in the trough of that extension member to force its bowed nub under the adjacent strip 10 until the nub 14 on the spring latches in the strip perforation 12. While a tool may be needed at the factory for sufficiently compressing (or more nearly flattening) each spring and forcing the spring into its latched normal position, no tool whatever is required during the adjusting of the length of the fixture strap, and no screws or the like are required for retaining the extension members in their adjusted positions. Consequently, I considerably reduce the time required for the adjusting,—as compared with fixture straps in which screws must be loosened to permit the adjusting and must afterwards be tightened to secure the adjustment—and also avoid the delays and difficulties encountered with screw-latched adjustable fixture straps when screws jar loose or are lost.

In practice, the height of the depending guide webs 6 (each pair of which laterally guides one of the extension members) only needs to be such as to leave a slight vertical clearance for the adjacent extension member below an end part of the main member, although the height of these guides has been exaggerated in the drawings to clarify them.

Since the range of adjustibility for each half of the fixture strap depends on the differences in length between a spring and a trough, the effective range of my strap can readily be increased either by shortening the springs or by lengthening the extension members so as to afford longer troughs, while employing the same central main member.

With the heretofore described embodiment, the threaded formations 9 at the outer ends of the extension members are adapted to receive the usual screws 18 for supporting a canopy from the fixture strap, as indicated in dotted lines in Fig. 1. However, I do not wish to be limited to the particular manner in which my fixture strap is supported or used, nor do I wish to be limited to the details of construction and arrangement above disclosed, since many changes might be made without departing either from the spirit of my invention or from the appended claims. For example, Fig. 7 shows another form of the central or main member of my fixture strap, namely one in which each end thereof is widened to afford a slot (19, 20) for receiving a screw by which the fixture strap may be supported from an outlet box.

I claim as my invention:

1. A fixture supporting strap comprising a central member, two longitudinally alined extension members slidably guided by the central member for movement toward or away from each other, two friction members each interposed between the main member and one of the extension members, and means associated with each friction member to prevent bodily movement of the latter with respect to the central member, each extension member having a stop formation disposed for engaging the adjacent friction member to limit the sliding of the extension member in one direction with respect to the central member.

2. A fixture supporting strap comprising a central bar, two extension members respectively underlying opposite end portions of the said bar, guides formed upon the two end portions of the bar and underhanging the extension members and arranged to permit each extension member to slide longitudinally of the bar, two downwardly bowed springs having their centers engaging the bar and each overhanging one of the extension members to press the latter against the guide underhanging that extension member; each extension member having at its inner end a stop portion adapted to engage the inner end of the spring overhung by that extension member, so as to limit the outward sliding movement of that extension member with respect to the bar; and means associated with each spring to prevent the spring from sliding longitudinally of the bar.

3. A fixture supporting strap comprising a horizontal bar having a socketing formation near each end of the bar, guide means fast on the bar near each end thereof, two extension members each slidable in one of the guide means longitudinally of the bar and each projecting beyond the adjacent end of the bar, and two friction springs each interposed between one of the extension members and the bar, each spring having a portion engaging one of the said socketing formations to prevent the spring from moving longitudinally of the bar; each extension member having a recess open towards the bar and entered by the spring associated with that extension member, the recess being considerably longer than the spring and having its inner end wall disposed for engaging the inner end of the spring to limit the outward sliding of that extension member with respect to the bar.

4. A fixture supporting strap comprising a generally horizontal bar; two extension members each underhanging one end portion of the bar and each having a perforation disposed beyond the adjacent end of the bar, two opposed guideways fast on each end of the bar and underhanging edge portions of one extension member to support that member and to guide that member for slidable movement longitudinally of the bar; and two friction members each disposed between the opposed guideways at one end of the bar and each operatively interposed between that bar end and the adjacent extension member; each friction member being interlocked with the bar to prevent movement of the friction member longitudinally of the bar; each extension member having a portion thereof disposed for engaging the inner end of the friction member to limit the outward sliding of that extension member with respect to the bar.

5. A fixture supporting strap comprising a generally horizontal bar; two extension members each underhanging one end portion of the bar and each having a perforation disposed beyond the adjacent end of the bar, two opposed guideways fast on each end of the bar and underhanging edge portions of one extension member to support that member and to guide that member for slidable movement longitudinally of the bar; and two friction members each disposed between the opposed guideways at one end of the bar and each operatively interposed between that bar end and the adjacent extension member; each friction member being interlocked with the bar to prevent movement of the friction member longitudinally of the bar; each extension member having two stop portions formed thereon and spaced by a distance greater than the length of the friction member; the said stop portions of each extension member being respectively disposed for engaging the two ends of the friction member to limit the sliding of the extension member in opposite directions with respect to the bar.

6. A fixture supporting strap comprising a central bar-like member having a guideway formed near each end thereof, the said guideways alining longitudinally of the bar; two extension members each underhanging one end portion of the bar and each supported and guided by one of the guideways for slidable movement longitudinally of the bar, the bar having two socketing formations respectively overhanging the two extension members; and two friction members interposed between the bar and the two extension members respectively, each friction member having a projection entering one of the socketing formations; each extension member having two stop portions spaced by a greater distance than the length of the friction member adjacent thereto, the said stop portions being disposed for respectively engaging the opposite ends of the adjacent friction member to limit the sliding of the extension member with respect to the central member.

7. A fixture supporting strap comprising a central member made of sheet metal and having two angle-sectioned guides formed from each end portion thereof to present pairs of webs spaced downwardly from the main parts of the said end portions; two extension members each supported by one pair of the said webs and laterally guided by the other pair of the said webs, each extension member having an upwardly open trough formed therein and shorter than the extension member; two upwardly bowed springs each having its tips engaging the bottom of one of the troughs and its medial portion bearing upwardly against one end portion of the central member, each spring being considerably shorter than the trough into which its ends extend and having the tips of the spring respectively disposed for engaging one end of the trough; each spring having a medially disposed and upwardly directed projection, and each of the said bar end portions having a socketing formation interlocked with one of the projections.

Signed at Chicago, Illinois, July 23rd, 1929.

KARL K. NIELSEN.